United States Patent
Ruble et al.

(10) Patent No.: US 10,049,475 B2
(45) Date of Patent: Aug. 14, 2018

(54) UTILIZING SELECTIVE TRIGGERING EVENTS FOR OPTIMIZING CHART VISUALIZATION

(71) Applicant: MICROSOFT TECHNOLOGY LICENSING, LLC, Redmond, WA (US)

(72) Inventors: B. Scott Ruble, Bellevue, WA (US); Catherine W. Neylan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/967,911

(22) Filed: Dec. 14, 2015

(65) Prior Publication Data

US 2017/0169592 A1 Jun. 15, 2017

(51) Int. Cl.
| | | |
|---|---|---|
| *G06T 11/20* | (2006.01) | |
| *G06F 3/0484* | (2013.01) | |
| *G06T 3/20* | (2006.01) | |
| *G06T 3/40* | (2006.01) | |
| *G06T 11/60* | (2006.01) | |

(52) U.S. Cl.
CPC ........ *G06T 11/206* (2013.01); *G06F 3/04845* (2013.01); *G06T 3/20* (2013.01); *G06T 3/40* (2013.01); *G06T 11/60* (2013.01); *G06T 2210/62* (2013.01)

(58) Field of Classification Search
None
See application file for complete search history.

(56) References Cited

U.S. PATENT DOCUMENTS

| | | |
|---|---|---|
| 5,502,805 A | 3/1996 | Anderson et al. |
| 5,784,067 A | 7/1998 | Ryll et al. |
| 7,961,188 B2 | 6/2011 | Cherry et al. |
| 8,239,765 B2 | 8/2012 | Alsbury et al. |
| 8,527,909 B1 | 9/2013 | Mullany |
| 8,810,574 B2 | 8/2014 | Alsbury et al. |
| 2003/0071814 A1* | 4/2003 | Jou .................. G06F 9/542 345/440 |
| 2007/0013697 A1 | 1/2007 | Gilboa |

(Continued)

FOREIGN PATENT DOCUMENTS

| | | |
|---|---|---|
| EP | 0350353 | 1/1990 |
| EP | 1465114 | 10/2004 |

OTHER PUBLICATIONS

Muñoz, Arturo., "Qlik Sense Search Cheat Sheet", Published on: Oct. 2, 2015 Available at: https://community.qlik.com/blogs/qlikviewdesignblog/authors/amz.

(Continued)

*Primary Examiner* — Barry Drennan
*Assistant Examiner* — Diana Hickey
(74) *Attorney, Agent, or Firm* — Workman Nydegger (57) ABSTRACT

Various methods, systems and storage devices are used for utilizing selective triggering events for optimizing chart visualizations. These selective triggering events can include determinations that chart elements are overlapping, that the chart elements are certain types of chart elements and/or that the chart elements are overlapping by a certain amount. The optimizations can include changing sizes, positions and/or transparencies of different chart elements.

19 Claims, 9 Drawing Sheets

(56) References Cited

U.S. PATENT DOCUMENTS

| | | | |
|---|---|---|---|
| 2008/0209354 A1* | 8/2008 | Stanek | G06F 9/45512 715/767 |
| 2010/0077328 A1* | 3/2010 | Berg | G06F 3/0481 715/764 |
| 2011/0050702 A1 | 3/2011 | Heimendinger | |
| 2012/0272186 A1* | 10/2012 | Kraut | G06F 3/0488 715/810 |
| 2014/0028227 A1 | 1/2014 | Yasuda et al. | |
| 2014/0055459 A1 | 2/2014 | Hirmatsu | |
| 2014/0282145 A1 | 9/2014 | Dewan | |
| 2014/0282276 A1 | 9/2014 | Drucker et al. | |
| 2015/0302051 A1 | 10/2015 | Baumgartner et al. | |
| 2016/0307344 A1* | 10/2016 | Monnier | G06T 11/206 |
| 2017/0132582 A1 | 5/2017 | Sakairi et al. | |

OTHER PUBLICATIONS

Kunz, Gion., "Chartist.js, an Open-Source Library for Responsive Charts", Published on: Dec. 16, 2014 Available at: http://www.smashingmagazine.com/2014/12/chartist-js-open-source-library-responsive-charts/.

"Making charts and maps responsive", Published on: Jan. 23, 2015 Available at: http://www.amcharts.com/tutorials/making-charts-responsive/.

Amico, Chris., "DavaViz for Everyone: Responsive Maps with D3", Published on: Aug. 26, 2013 Available at: http://eyeseast.github.io/visible-data/2013/08/26/responsive-d3/.

"Introducing responsive charts and maps", Published on: Jan. 26, 2015 Available at: http://www.amcharts.com/blog/responsive-charts/.

Sikkema, Albert., "Responsive charts using CSS media queries", Published on: Dec. 4, 2012 Available at: http://forum.highcharts.com/highcharts-usage/responsive-charts-using-css-media-queries-t22558/.

"Smart Charts", Retrieved on: Oct. 7, 2015 Available at: https://codeontime.com/learn/touch-ui/charts/smart-charts.

"Zing chart", Retrieved on: Oct. 7, 2015 Available at: http://www.zingchart.com/features/responsive-charts/.

Rigdon, Sarah., "Print Vs. Web, Static Vs. Interactive", Retrieved on: Oct. 7, 2015 Available at: https://infoactive.co/data-design/ch16.html.

"Responsive Web Design concepts", Published on: Apr. 15, 2015 Available at: http://docs.telerik.com/kendo-ui/using-kendo-in-responsive-web-pages.

Acampora, Jon., "How to Make Your Excel Dashboards Resize for Different Screen Sizes", Published on: Jul. 20, 2015 Available at: http://www.excelcampus.com/vba/resize-dashboards-for-screen-sizes/.

Potschien, Denis., "Chartist.js Creates Responsive, Animated Charts with SVG", Published on: Jun. 12, 2015 Available at: http://www.noupe.com/design/chartist-js-creates-responsive-animated-charts-with-svg-88363.html.

International Search Report and the Written Opinion issuec in PCT Application No. PCT/US2016/065033 dated Mar. 1, 2017.

Christopher, "Some simple tricks for creating responsive charts with D3", Published Nov. 23, 2015. Retrieved from <<http://blog/webkid/io/responsive-chart-usability-d3/190 Prevent_ overlapping_of_x-axis_labels>>.

"Responsive Graph Presentation", IP.com Journal, IP.com Inc., West Henrietta, NY, US, Dec. 27, 2013.

Pengfei XU et al: "GACA", Human Factors in computing Systems, ACM, 2 Penn Plaza, Suite 701 New York NY 10121-0701 USA, Apr. 18, 2015, pp. 2787-2795.

Cameron McCormack et al: "Authoring Adaptive Diagrams", Document Engineering, ACM, 2 Penn Plaza, Suite 701 New York NY 10121-0701 USA, Sep. 16, 2008, pp. 154-163.

Kim Marriott et al: "Fast and efficient client-side adaptivity for SVG", Proceedings of the 11th International Conference on World Wide Web, ACM, Honolulu, Hawaii, USA, May 7, 2002, pp. 496-507.

Yingcai WU et al: "ViSizer: A Visualization Resizing Framework", IEEE Transactions on Visualization and Computer Graphics, IEEE Service Center, Los Alamitors, CA, US, vol. 19, No. 2, Feb. 2013, pp. 278-290.

International Search Report and Written Opinion issued in Published PCT Application No. PCTUS2017-016667 dated Jun. 22, 2016.

International Search Report and the Written Opinion issued in PCT Patent Application No. PCT/US2017/016751 dated Jun. 29, 2017.

2nd Written Opinion issued in Published PCT Application No. PCT/US2016/065033, dated Oct. 24, 2017.

Office Action dated Oct. 18, 2017 cited in U.S. Appl. No. 15/043,176.

"International Preliminary Report on Patentability Issued in PCT Application No. PCT/US2016/065033", dated Mar. 5, 2018, 8 Pages.

* cited by examiner

UTILIZING SELECTIVE TRIGGERING EVENTS FOR OPTIMIZING CHART VISUALIZATION

BACKGROUND

Some computer applications are configured to present data aggregations as chart visualizations that reflect relative relationships between the underlying data. These chart visualizations include charts, graphs, plots, maps, tables and other visualizations, all of which can be broadly referred to as chart visualizations and, even more broadly, as charts.

It is common for chart visualizations to include labels, legends, titles, values, gridlines, visual boundaries, tick marks, and other textual and graphical elements that help identify, describe, quantify and/or otherwise associate the different visual components and underlying data. All of these elements can be broadly referred to as chart elements.

To improve the readability and visual appearance of a chart, a designer and corresponding application interface will typically configure the chart with certain fonts, resolutions and dimensions that account for the intended size and display attributes of the target display device(s). For instance, a chart that is rendered on a desktop monitor will often be configured for display with larger fonts and, sometimes, with more chart elements than when the same chart is configured for presentation on smaller handheld devices.

Some software applications, including Microsoft's Excel®, are specifically configured to adjust the display attributes of a chart in response to the resizing of the chart. For instance, when a chart is initially created in Excel®, the default size of the chart is 600 pixels wide by 360 pixels tall (e.g., 5"×3"). The elements of the chart (e.g., legend, title, etc.) are laid out within the chart based on this default size for preferred readability and aesthetics. When the chart is subsequently reduced in size, due to user input and/or in response to displaying the chart on a different device, the software is capable of scaling the chart elements accordingly. It is also possible to reposition one or more of the chart elements within a corresponding chart.

The repositioning and resizing of chart elements, which can be performed automatically and manually, can sometimes help fit chart elements within the new boundaries of a reduced visualization chart, at least to a certain point. However, these modifications can sometimes degrade the legibility, aesthetic appeal and overall usefulness of the chart visualization. For example, reducing font sizes can create text that is too small to be read. Likewise, repositioning chart elements can create situations in which the chart elements overlap, also rendering a chart unreadable, or at least unattractive.

Accordingly, there is an ongoing need for improved systems and methods for managing chart visualizations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided for optimizing chart visualizations and, even more particularly, to utilizing selective triggering events for optimizing chart visualizations.

In some embodiments, a computing system accesses a chart visualization that includes a plurality of different chart elements and detects input associated with resizing the chart visualization. Then, the computing system determines that the resizing causes or involves a triggering event in which at least two of the different chart elements overlap as a result of the resizing. These elements include any quantity of textual and/or graphical elements that are determined to be overlapping within the chart.

In response this triggering event, the computing system optimizes the display of the chart visualization by at least displaying a resized chart visualization and by modifying the one or more different chart elements in such a manner that they are determined to no longer be overlapping, or at least until they are no longer overlapping by at least a predetermined amount of overlap. The modifications performed include any combination of resizing, repositioning, removing, hiding and/or changing a transparency of the element(s).

In related embodiments, the computing system detects input affecting visibility of a chart visualization and that causes a triggering event of one or more chart elements to be at least partially obscured. Sometimes, this includes the movement of an object that is external to the boundaries of the chart visualization being moved into an overlapping position with the chart visualization. In response to the triggering event, the computing system selectively optimizes a display of the chart visualization by at least displaying a modified chart visualization and by at least modifying one or more of the different chart elements so that the one or more of the different chart elements are no longer at least partially obscured. This modification can include any combination of resizing, repositioning, removing, hiding and/or changing a transparency of the element(s).

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Aspects of the disclosed embodiments generally relate to the optimizing of chart visualizations and, even more particularly, to methods, systems and storage devices for optimizing chart visualizations by utilizing selective triggering events.

In some embodiments, a computing system accesses a chart visualization that includes a plurality of different chart elements and detects input associated with resizing the chart visualization. Then, the computing system determines one or more triggering event has occurred, in which at least two of the different chart elements overlap as a result of the resizing. In response, the computing system optimizes the display of the chart visualization by at least displaying a resized chart visualization and by modifying the one or more different chart elements in such a manner that they are determined to no longer be overlapping, or at least until they are no longer overlapping by at least a predetermined amount of overlap.

In related embodiments, the computing system detects input affecting visibility and/or readability of chart elements. The computing system detects triggering events that include reduced visibility of one or more chart elements. Sometimes, this includes the movement of an object that is external to the boundaries of the chart visualization being moved into an overlapping position with the chart visualization. In some embodiments, this includes changes to display attributes of chart elements or other objects that affect the visibility of the chart elements. In response to the triggering event(s), the computing system selectively optimizes a display of the chart visualization by at least displaying a modified chart visualization and by at least modifying one or more of the different chart elements so that the one or more of the different chart elements are no longer at least partially obscured.

This modifications made in response to triggering events include any combination of resizing chart elements, repositioning chart elements, temporarily removing or permanently removing chart elements, replacing chart elements, hiding and/or changing a transparency of the element(s), or changing other display attributes of the chart elements.

There are various technical effects and benefits that can be achieved by implementing aspects of the disclosed embodiments. By way of example, the disclosed embodiments can be used to preserve readability of and aesthetic appeal of charts and their corresponding textual and/or graphical elements, automatically in response to triggering events, like the detection of overlapping elements, that occur during resizing or movement of objects, and which might compromise or degrade the readability or aesthetic appeal of the chart.

The technical effects related to the disclosed embodiments can also include improved user convenience and efficiency gains through a reduction in steps required by a user making chart modifications. The technical effects also include efficiency gains through a reduction in processing overhead required for receiving and processing multiple manually user inputs for adjusting chart elements.

Various methods, computing systems and storage devices will now be described with reference to the disclosed embodiments for optimizing chart visualizations selectively based on the utilization of triggering events.

In this description and in the claims, the term "computing system" is defined broadly as including any device or system (or combination thereof) that includes at least one physical and tangible processor, and a physical and tangible memory capable of having thereon computer-executable instructions that may be executed by the processor.

Figure 1:
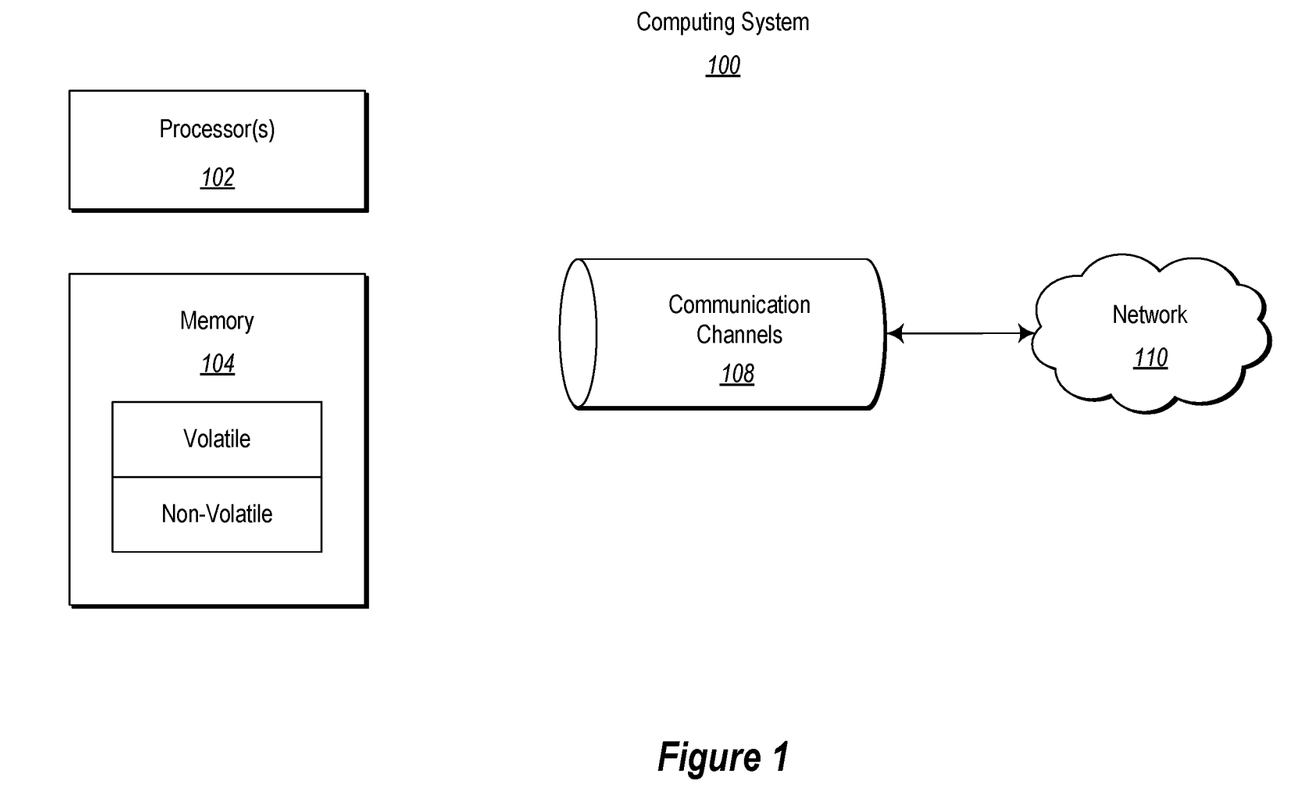
FIG. 1 illustrates an embodiment of a computing system which is usable to implement aspects of the disclosed embodiments for creating and utilizing an analysis view for pivot table interfacing.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

Figure 3:
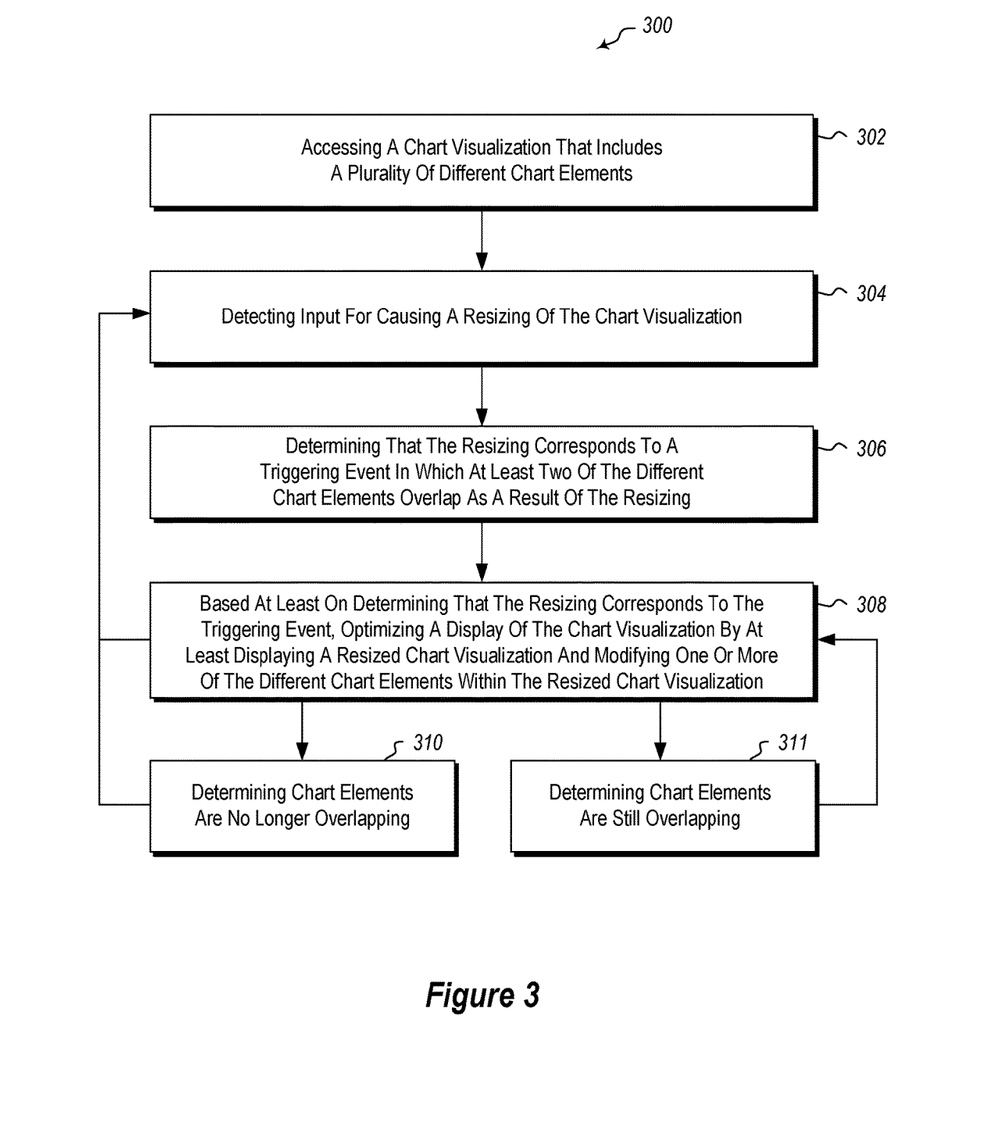
FIG. 3 illustrates a flowchart of at least one method for utilizing selective triggering events for optimizing chart visualizations.
Figure 15:
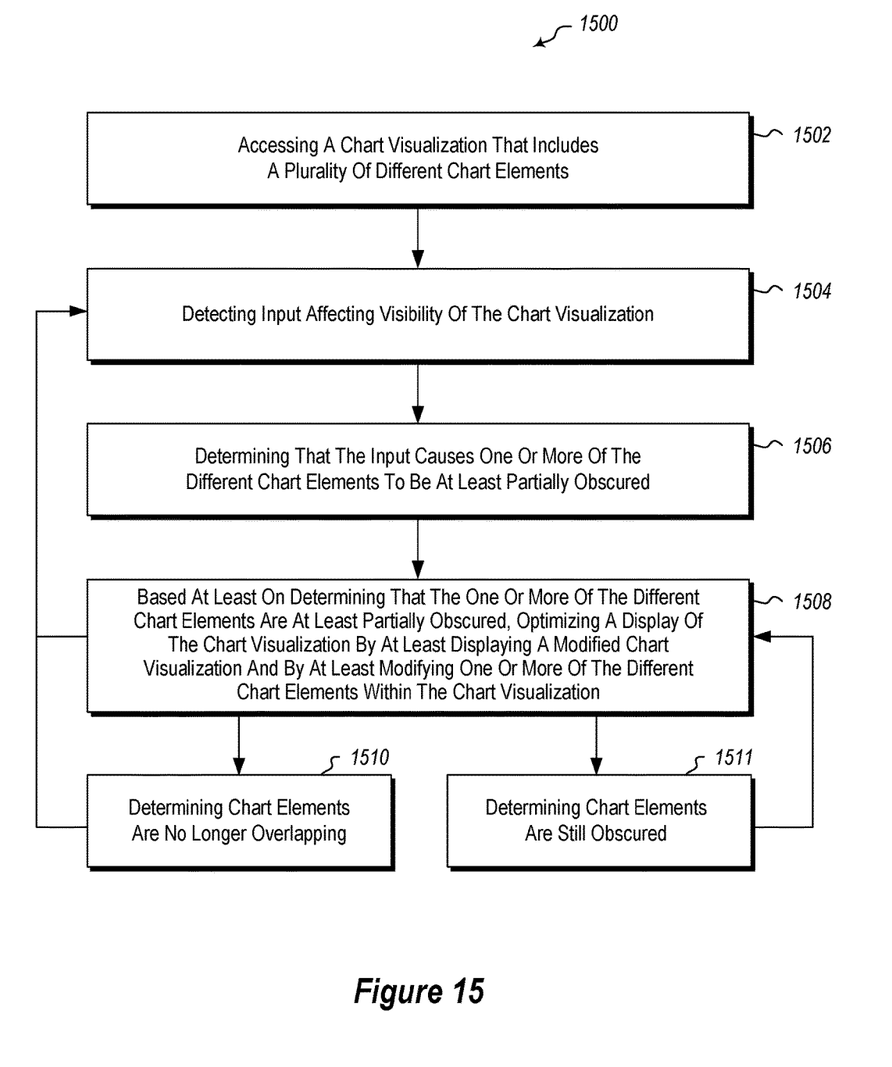
FIG. 15 illustrates a flowchart of at least one method for utilizing selective triggering events for optimizing chart visualizations.

The computer-executable instructions may be used to implement and/or instantiate all of the disclosed functionality, particularly as disclosed in reference to the methods illustrated in the flow diagrams of FIGS. 3 and 15.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Various methods for implementing the disclosed embodiments with a computing system, like computing system 100, will now be described.

Figure 2:
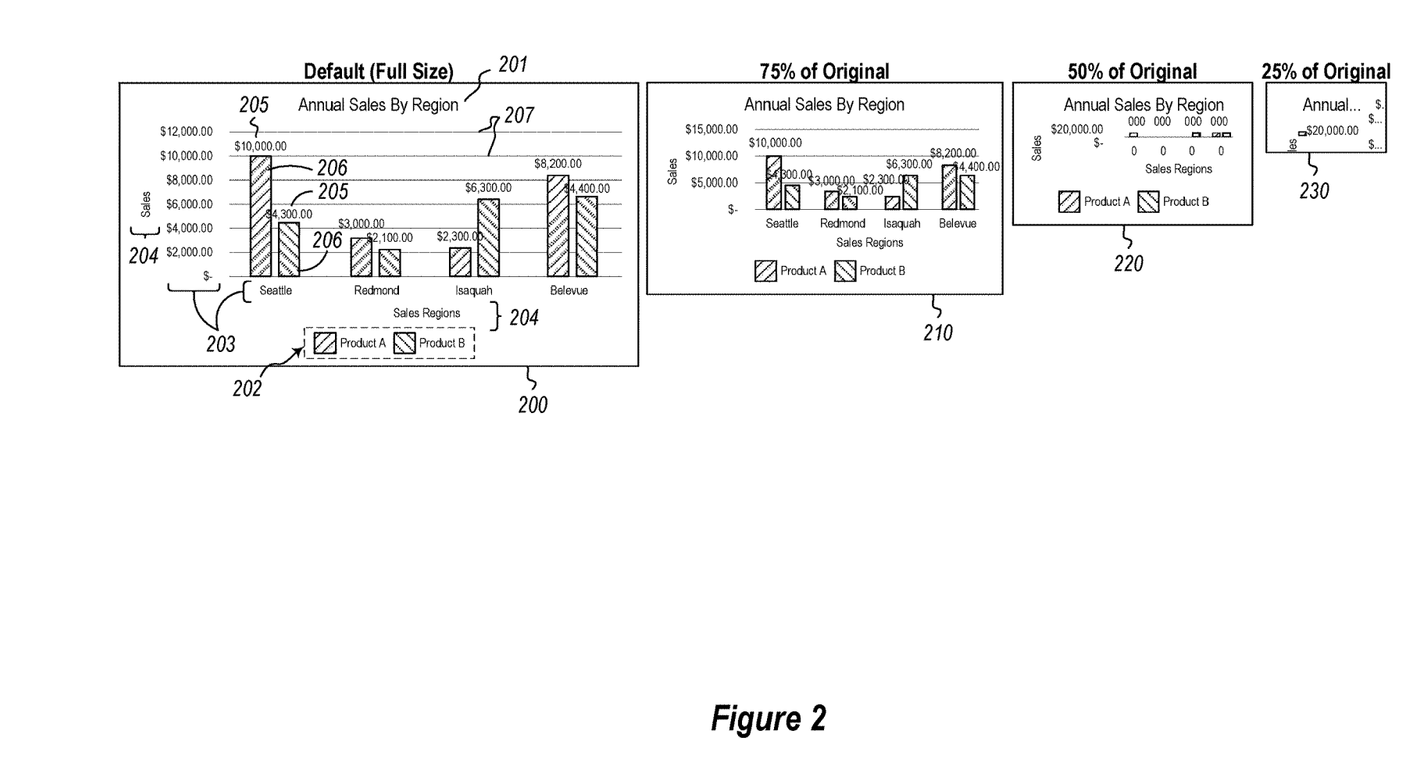
FIG. 2 illustrates a set of charts having different size presentations.

FIG. 2 illustrates a plurality of chart visualizations (200, 210, 220 and 230) that correspond to underlying data. In the present example, the underlying data comprises sales data and the chart visualization reflects annual sales by regions.

The first chart visualization 200 is rendered at a default size. In this default size, various chart elements are presented, including a title 201, a legend 202, data labels 203, axis labels 204, in-chart labels 205, graphical data objects 205, and gridlines 207.

Chart visualization 210 is based on the same underlying data as chart visualization 200, but fewer chart elements are presented. The font size and position of some of the chart elements have also been changed. This can be done, according to some implementations, to improve readability of the chart visualization 210 at the reduced size which, in this case, is at a 25% reduction of the original default size, such that it is now rendered at 75% of the original size. Similarly, a reduction of the original chart visualization 200 by 50% is shown by chart visualization 220, which includes even fewer chart elements. Finally, chart visualization 230 reflects a 75% size reduction of the original size, such that it is now rendered at 25% of the original size, and which includes yet even fewer chart elements. In some instances, the chart elements are replaced by new chart elements to facilitate the readability of chart (e.g., adding labels $15,000.00 (in chart visualization 210) and label $20,000.00 (in chart visualizations 220 and 230).

Despite the foregoing modifications, whether performed manually or automatically, it can still be difficult, sometimes, to read all of the text that is presented within the labels, depending on the size of the text, the amount of overlap and the variance in contrast between the overlapping elements and the other display attributes of the chart elements (as shown). The aesthetic appeal of the chart can also be affected in a negative way, depending on when the foregoing changes are made or not made, as well as how they are made.

To help address at least some of the foregoing problems, embodiments of the invention can be utilized to further improve the optimization of chart visualizations by automatically modify the chart visualizations in response to detecting triggering events that are associated with the overlapping of different chart elements and depending on one or more of the attributes of the overlap (e.g., amount of overlap, variance in contrast and transparency of the elements, the types of elements, etc.).

In some embodiments, for example, a detected overlap of chart elements and/or other obscuring of chart elements will automatically trigger one or more modification to chart visualizations that at least partially reduce or that eliminate the type of overlap or obscuring that was occurring. The modification can include repositioning chart elements, temporarily removing or permanently removing chart elements, replacing chart elements, changing display attributes of the chart elements (e.g., size, font, transparency, contrast, coloring, etc.) and/or any combination of the foregoing. The modification can also include reversing or refraining from implementing input that caused the overlapping to occur.

Various examples of methods for utilizing selective triggering events for optimizing chart visualizations will now be described with reference to the chart visualizations shown in FIGS. 2-14 and 16-17. These embodiments will also be described with reference to the methods that are illustrated by the flowcharts of FIGS. 3 and 15.

The flowchart 300 of FIG. 3, for instance, illustrates a method that starts with a computing system accesses a chart visualization that includes a plurality of different chart elements. The accessed chart visualization can be of any chart type, including, but not limited to, one or more bar charts, bubble charts, pie charts, line charts, column charts, area charts, scatter plots, combo charts, doughnut charts, surface charts, radar charts, histogram charts, pareto charts, waterfall charts, box & whisker charts, treemap charts, sunburst charts, funnel charts, or other charts, plots or graphs, maps, tables or other visualizations that reflect relationships between data aggregations or any other types of data.

The types of chart elements referred to by this disclosure include any type of chart element, including one or more textual elements or graphical elements. The textual elements can include any combination of number, character and/or symbol. Graphical elements includes any combination of one or more axis lines, grid lines, tick marks, lines, bars, wedges, circles, squares, dots, or any other shapes, icons, pictures, animations or any other graphical elements.

Each of the different chart elements have one or more corresponding display attributes, including one or more coloring, contrast, brightness, size, font type, thickness, shading, orientation, tapering, transparency, or other display attribute. These display attributes can be default attributes or user defined attributes that are stored in and accessible through data structures stored in the system memory.

The chart visualization may also have general chart display attributes associated with scaling and size, as well as any of the foregoing display attributes described with regard to the chart elements.

At some point in time, the computing system detects input for causing a resizing of the chart visualization (act 304). This can occur, for example, based on determining that the chart visualization is to be rendered on a display device having particularly size constraints that require resizing of the chart visualization from an initial size. The input can also include user input that causes resizing (e.g., zooming in or out) within a chart viewport and/or the resizing of a viewport relative to an interface/browser layout viewport in which the chart viewport is presented.

Then, upon determining that the resizing corresponds to a triggering event in which at least two of the chart elements overlap as a result of the resizing (act 306), the system displays the resized chart visualization with modifications to one or more of the different chart elements within the resized chart visualization (act 308).

In some instances, the triggering event(s) include detecting an overlap that is about to occur, prior to actually rendering the visualization by the graphics card and/or the presentation of the chart visualization on a system display screen.

In some embodiments, the triggering event(s) include detecting an actual overlap that is being rendered to a user on a display device, by analyzing the resized chart visualization simultaneously to or after it is being processed for display, In some embodiments, the triggering event(s) include detecting that the overlap is occurring with one or more predetermined chart elements. These predetermined chart elements can include any combination of one or more textual or graphical elements (e.g., one or more legend, title, label, value, a largest element, a smallest element, multiple textual chart elements, multiple graphical chart elements, chart elements that are within a predetermined visibility threshold based on contrasts or transparencies, elements having particular coloring, elements having particular shading, elements having particular sizes, fonts, shapes, or other display attributes).

In some instances, the triggering event(s) include detecting that the overlap exceeds a predetermined threshold amount, such as a predetermined percentage of one of the elements (e.g., X % of total area of the element(s)) is overlapped and/or a predetermined magnitude of the element(s) is overlapped (e.g., a predetermined number of pixels, characters, quantity of elements, or other magnitude of detectable overlap).

The triggering event(s) used to initiate a modification of one or more chart elements can also include the changing of a display attribute without actually increasing or otherwise changing an amount of overlap that already existed. For instance, if two elements were already overlapping, but their transparencies, relative contrasts, coloring, or other display attributes were within a predetermined tolerance of visibility (as defined by one or more stored tolerance values), a triggering event would not be determined. However, a change to a display attribute of one of the chart elements would then be sufficient to be cause a triggering event when the change in the display attribute causes the transparencies, relative contrasts, coloring, or other display attributes to fall outside of a predetermined tolerance of visibility for overlapping elements.

In some embodiments, the trigger event includes a combination of two or more of the foregoing triggering events, for two, three or any other quantity of overlapping chart elements.

The process for detecting the triggering events, includes, according to some embodiments, referencing tables and other data structures that specify the relative or fixed placements of the different chart elements and/or their corresponding display attributes. In some embodiments, the processes for detecting the triggering events includes, additionally, or alternatively, intercepting or otherwise accessing data sent to or received from the graphics card on the computing system or application interface(s) (e.g., spreadsheet table) processing the chart visualizations.

In some embodiments, the settings for controlling what qualifies as adequate triggering events are user defined, through menus that enable the receipt of user input that is operable to define the user settings.

In some embodiments, the settings for controlling what qualifies as adequate triggering events are based on chart type, element type, display type and/or chart visualization size, such that the settings differ for different types of charts, chart elements and/or display types.

In some instances, after the modification is made, the embodiments of the invention also include determining that the chart elements are no longer overlapping (act 310), or else determining that the chart element are still overlapping (311). Then, based on this determination, the methods of the invention will return to implement one or more of the foregoing acts for detecting new input (act 304) and/or for further modifying one or more of the chart elements (act 308).

Some examples of different optimizations that are performed responsive to the disclosed triggering events will now be described with reference to FIGS. 4-14.

Figure 4:
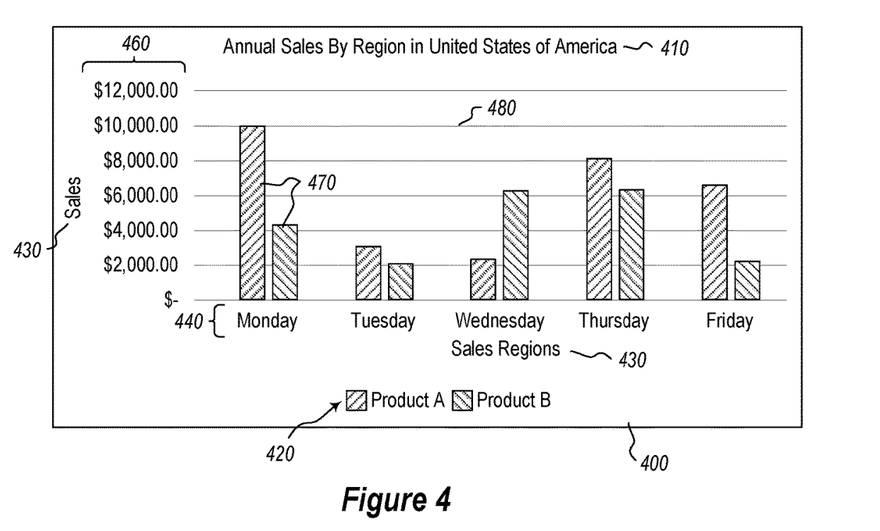
FIGS. 4-14 illustrate examples of charts having different size presentations.

As shown in FIG. 4, a chart visualization 400 is presented with various chart elements, including a title 410, a legend 420, axis category labels 430 (i.e., Sales and Sales Regions), tick mark labels 440 and tick mark labels 460 and graphical elements 470 (only some of which are referenced) and that visually reflect how the underlying data is related to both the different labeled categories (e.g., sales regions by day) and scaled sales values. The chart visualization 400 also includes gridlines that help reflect relative magnitudes of the different underlying data intersections that are presently illustrated by the graphical elements 470.

Figure 5:
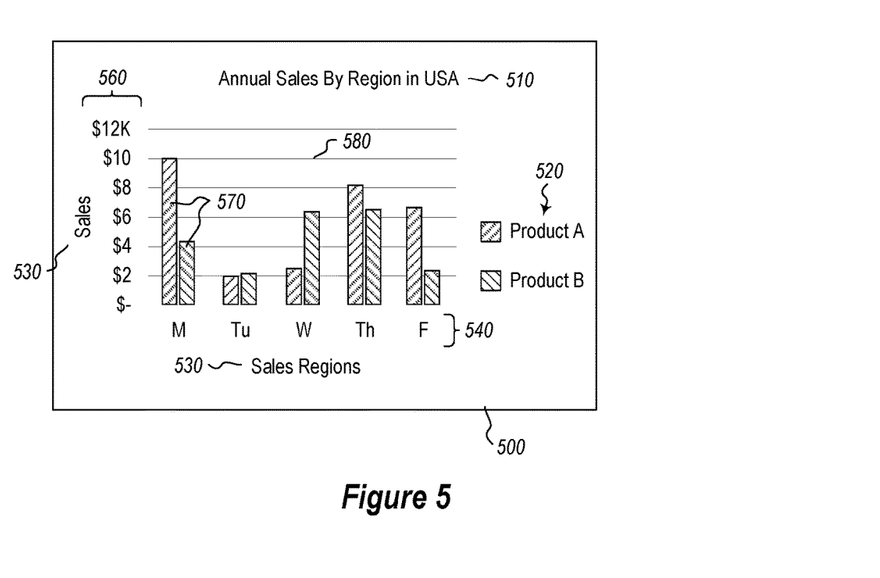

Chart visualization 400 is then resized chart visualization 500, responsive to user input or an application process. During the resizing process (e.g., before, during or after the actual rendering of the resized visualization), the computing system detects one or more triggering event(s) (as described above). Although not presently shown, the triggering event(s) in this example include detecting an overlapping of one of the axis labels 430 (sales regions) with legend 420 and/or the tick mark labels 440, and the overlapping of one of the axis labels 430 (sales) with tick mark labels 460 and/or with the title 410.

Responsive to the foregoing triggering event(s), the system modifies one or more of the chart elements in the resized chart visualization 500 shown in FIG. 5, by abbreviating a portion of the title (e.g., using the term USA instead of United States of America), by abbreviating the numerical presentation of the tick mark labels 540 and 560, and by moving the legend 520.

Figure 6:
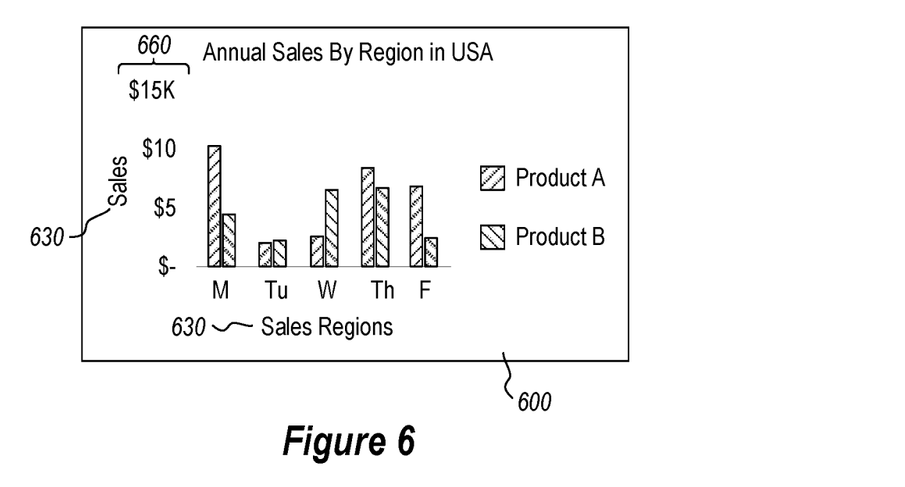

Further resizing of the chart visualization 500 causes the system to present resized chart visualization 600, shown in FIG. 6. This further resizing results in new triggering events, not shown, such as the overlap of the legend 520 with the gridlines 580 and/or the overlap of some of the tick mark labels 560. As a result, the system automatically removes some of the tick mark labels, now represented as tick mark labels 660 in the resized chart visualization 600. Also, the gridlines 580 are removed, such that the resized chart visualization 600 omits all gridlines.

Figure 7:
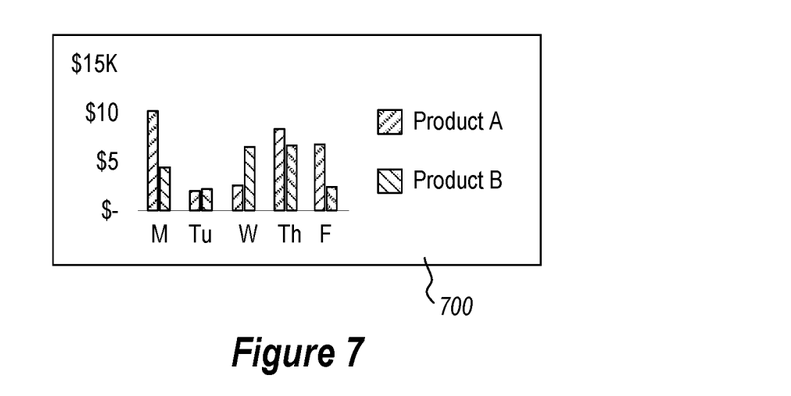

The category axis labels 630 are still presented is this visualization 600. But, they are removed when the chart visualization 600 is further reduced in size to the format of chart visualization 700.

Figure 8:
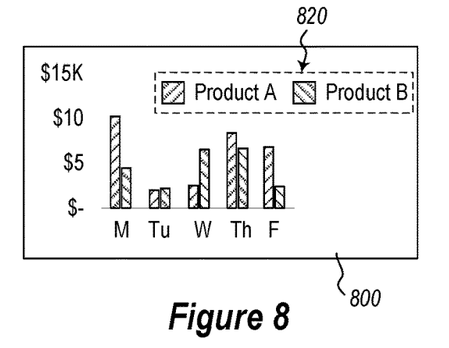

When chart visualization 700 is reduced in shape and size, by disproportionately reducing the horizontal dimensions of the chart visualization, the legend overlaps with one or more of the other chart elements in such a manner as to be considered a triggering event. As a result, legend 820 is repositioned and reconfigured into the format shown in chart visualization 800.

Figure 9:
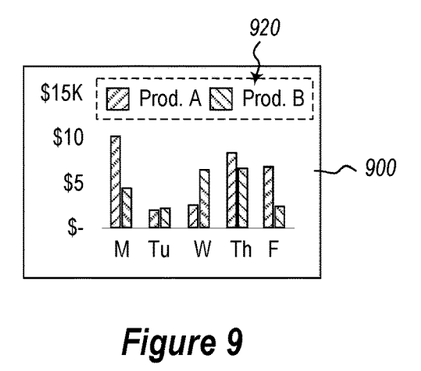

Further reduction of the chart visualization 800, which results in the new chart visualization 900 is also determined to cause a triggering event that includes an overlap of legend 820 with one or more of the tick mark labels or the legend extending beyond the viewport boundaries of the chart visualization 820. In response, the content of the legend is abbreviated and presented in modified legend 920 within chart visualization 900.

Figure 10:
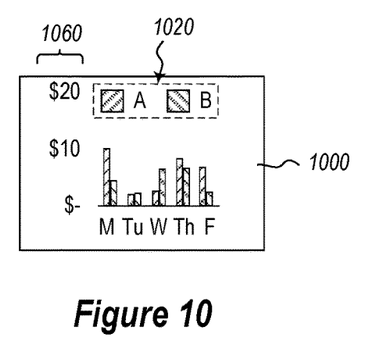

Similarly, a further reduction of size of the chart visualization 900 triggers yet a further modification to the content of the legend 920, as reflected by modified legend 1020 in chart visualization 1000. The tick mark labels have also been modified to reflect different incremental values in the scaling as modified tick mark labels 1060.

FIGS. 11-14 represent additional examples for modifying chart elements responsive to detected triggering events comprising overlap of chart elements.

Figure 11:
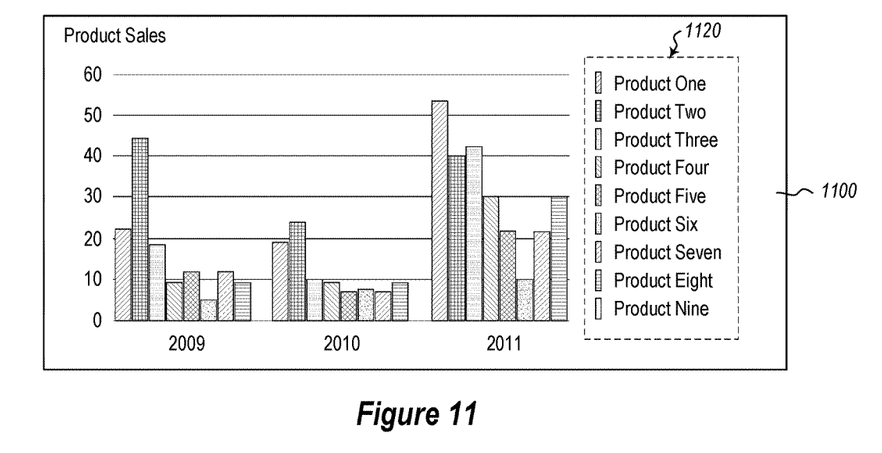
Figure 12:
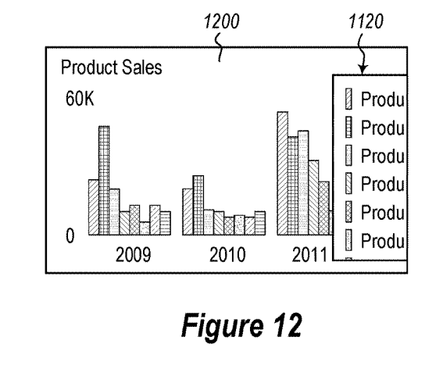

As shown in FIG. 11, a chart visualization 1100 includes a legend 1120 that is presented separately from the other chart elements. However, resizing of the chart visualization 1100 causes the legend 1120 to overlap with at least some of the chart elements, such as the graphical objects associated with calendar year 2011. This is shown in the visualization of FIG. 12. The legend 1120 also extends beyond the viewport boundaries of the chart visualization, such that only a limited portion of the legend is shown. These affects, alone and in combination, comprise triggering events.

Figure 13:
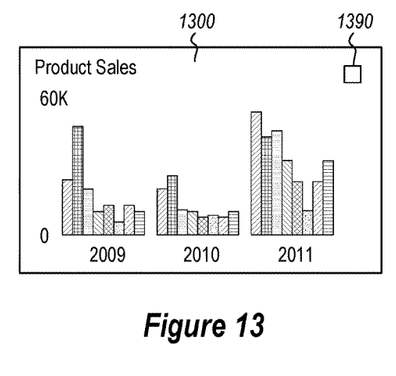

In response to detecting one or more triggering events, the system creates modified chart visualization 1300, which includes icon 1390. Icon 1390 comprises an interactive tootip to access the legend, which has become nested or hidden within the chart visualization, such that selection of the icon 1390 will cause the legend to be displayed with the chart visualization 1300. In some instances, the display of the legend (by selecting icon 1390) will occur without causing an overlap of chart elements (e.g. by displaying outside of the chart viewport boundaries, or by extending the viewport boundaries. Alternatively, the legend is displayed in such a manner that it does overlap chart elements, since the display is only temporary.

Figure 14:
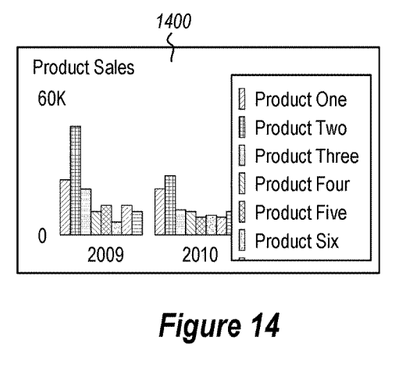

In some embodiments, when the legend is not nested, but is persistently displayed with the other chart elements, it is positioned and displayed in such a manner that it does not completely obscure the view of any particular element that belongs to a defined set of elements that is at least partially shown. For instance, as shown in FIG. 14, the legend is positioned to only partially overlap a portion of a last bar of the 2010 graphical elements. In this manner, a user can view the full set of data corresponding to year 2010. However, all of the 2011 data elements are completely obscured in this embodiment, as it does not make sense to partially show an incomplete set of data elements.

Although many of the foregoing examples correspond to overlap of chart elements belonging to a single chart, it will be appreciated that the breadth of scope of the disclosed embodiments also relates to overlap of chart elements from objects that are external to the chart visualization containing the chart elements. By way of example, a separate chart or another object can also be positioned over one or more of the chart elements to create an overlapping triggering event in which the chart element(s) will be at least partially obscured. Such an occurrence, even though it involves an overlap of an external object will be sufficient to trigger modification of the chart element(s) according to the disclosure presented herein.

FIG. 15, for example, reflects a flowchart 1500 of acts associated with utilizing selective triggering events for optimizing chart visualizations in which the trigger events include determinations that chart elements are partially obscured.

As shown, the flowchart 1500 includes a system accessing a chart visualization with chart elements (act 1502). This is performed, as described above with regard to act 302 of FIG. 3. Next, the system detects input affecting visibility of the chart visualization (1504). This includes processes described above with regard to act 304 of FIG. 3.

The triggering event(s) also include, in some instances, processes that include moving an object that is external to the chart into a position that overlaps one or more chart elements. The triggering event(s) also include, in some instances, changing display attributes of the chart (e.g., changing a positioning of an element responsive to a drag and drop or the addition of a new chart element that creates an overlap of chart elements). The triggering event(s) also include, in some instances, changing display attributes of the chart element(s) and/or the other object(s) external to the chart (e.g., changing transparency settings of an external object that already overlaps with the chart, such that the visibility threshold tolerance of the chart element(s) is now obscured to the point that it falls outside of the visibility threshold tolerance).

Once a determination is made that one or more of the chart element(s) have actually become sufficiently obscured (act 1506), based on predetermined threshold settings or any of the other triggering events, the computing system will automatically cause a modification of the chart element(s) (1508). The modification (act 1508) will automatically occur to a degree that the obscuring of the object(s) no longer exists, based on implementing any of the processes described herein (e.g., moving, removing, resizing, changing or otherwise modifying chart elements). The system then determines that the chart elements and/or other objects are no longer overlapping (1510) in such a way as to constitute a triggering event or, alternatively, the system can determine that one or more of the chart elements are still obscured (1511). If they are, further modification can be made (1508).

Figure 16:
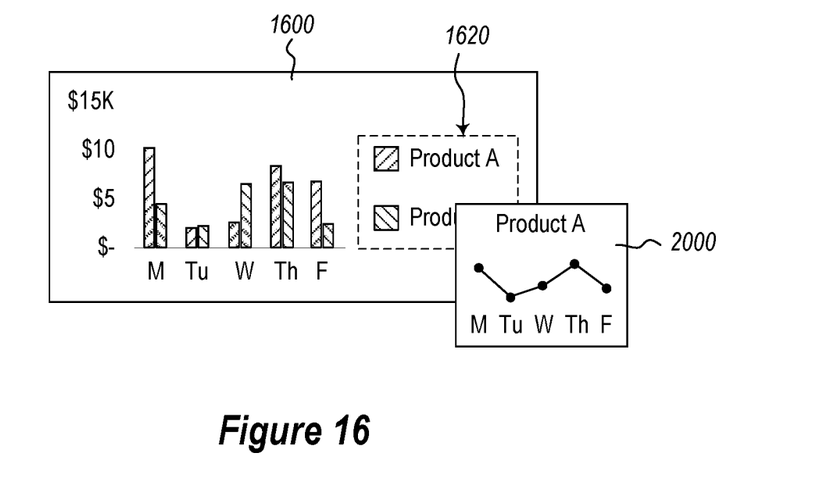
FIG. 16-17 illustrate examples of overlapping charts.
Figure 17:
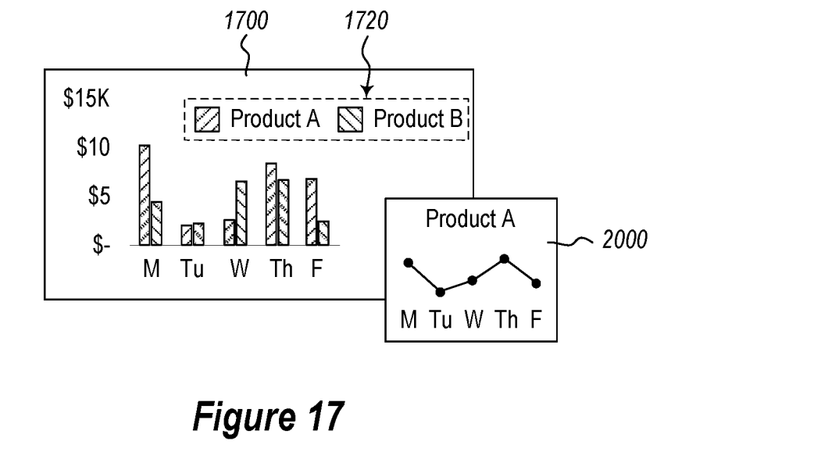

FIGS. 16 and 17 illustrate an example of modifications based on a triggering event based on an external object obscuring one or more chart element(s). As shown in FIG. 16, for example, a first chart 1600 with chart elements is displayed. The chart elements include legend 1620, which is partially obscured by object 2000. This is detected as a triggering event for causing modification of the chart visualization 1600. As a result, the chart visualization is automatically modified into chart visualization 1700 of FIG. 17. In this modified chart visualization 1700, the legend 1720 has been repositioned and restructured in such a way that it is no longer obstructed by the presentation of object 2000.

Many of the foregoing examples relate to the automatic modification of chart elements. In this regard, however, it will be noted that the system may also present the user with a popup menu or other interface element that queries the user about whether the changes should be made or not, prior to persisting the changes. In these embodiments, the interface may present the modified/resized chart visualization to the user in a separate frame to select from, along with a plurality of alternative modified visualizations that resolve the overlap/obscuring in different ways.

In some embodiments, the system may also undo or ignore input that causes the triggering event associated with overlapping or obscured chart elements when it is determined there is no adequate resolution (e.g., no way to modify the chart elements while still preserving a presentation of minimum set of chart elements, wherein the minimum set of chart elements are any predefined set of the chart elements). For instance, if a resizing will require all fonts to be displayed in a scaled down size that is too small to be readable or otherwise visible, the system can ignore at least some instructions for scaling down the font of one or more elements, to preserve a readable sized-font.

It will be appreciated that foregoing aspects of the disclosed embodiments can be used to facilitate the optimization of chart visualization, as described above. While examples of these optimizations and corresponding triggering events have been described with regard to bar charts, it will be appreciated that the scope of this disclosure relates to optimizations and triggering events for all types of chart visualizations.

Furthermore, although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. A computing system configured for utilizing selective triggering events for optimizing chart visualizations, the computing system comprising:
   one or more processors; and
   one or more hardware storage device having stored computer-executable instructions which are executable by the one or more processors to optimize computer visualizations by at least causing the computing system to perform the following:
      the computing system accessing a chart visualization, displayed at the computing system, that includes a plurality of different chart elements;
      the computing system detecting input for causing a resizing of the chart visualization;
      the computing system determining that the resizing corresponds to a triggering event in which at least two of the different chart elements overlap as a result of the resizing; and
      the computing system, in response determining that the resizing corresponds to the triggering event, optimizing a display of the chart visualization by at least displaying a resized chart visualization and modifying the one or more different chart elements of the at least two different chart elements within the resized chart visualization, including removing the one or more different chart elements of the at least two different chart elements from a main portion of the chart visualization and placing it into an interactive tooltip.

2. The computing system of claim 1, wherein determining that the resizing corresponds to the triggering event includes determining that different chart elements are not yet, but will be, displayed as overlapping as a result of rendering a resized version of the chart visualization.

3. The computing system of claim 1, wherein determining that the resizing corresponds to the triggering event includes determining that different chart elements are currently in a state of being displayed as overlapping within a resized version of the chart visualization.

4. The computing system of claim 1, wherein the triggering event includes determining that the at least two different chart elements are overlapping by a predetermined amount of overlap.

5. The computing system of claim 1, wherein the triggering event includes determining that the at least two different chart elements include at least three different chart elements that are overlapping.

6. The computing system of claim 1, wherein the triggering event includes determining that the at least two different chart elements are textual elements that are overlapping.

7. The computing system of claim 1, wherein the triggering event includes determining that the at least two different chart elements are graphical and non-textual elements that are overlapping.

8. The computing system of claim 1, wherein the triggering event includes determining that the at least two different chart elements include at least one textual element and at least one graphical and non-textual element that are overlapping.

9. The computing system of claim 1, wherein the optimizing includes changing a size of the one or more of the different chart elements.

10. The computing system of claim 1, wherein the modifying includes changing a transparency or contrast of one or more of the at least two different chart elements.

11. The computing system of claim 1, wherein the optimizing includes deleting the one or more of the different chart elements.

12. The computing system of claim 1, wherein the optimizing includes repositioning the one or more of the different chart elements.

13. The computing system of claim 1, wherein the chart visualization includes at least a bubble chart.

14. The computing system of claim 1, wherein the chart visualization includes at least a bar chart.

15. The computing system of claim 1, wherein the chart visualization includes at least a map.

16. A computer-implemented method for utilizing selective triggering events for optimizing chart visualizations, the method being implemented by a computing system that includes at least one processor and one or more hardware storage device having stored computer-executable instructions that are executable by the at least one processor for implementing the method, the method comprising:
the computing system accessing a chart visualization, displayed at the computing system, that includes a plurality of different chart elements;
the computing system detecting input for causing a resizing of the chart visualization;
the computing system determining that the resizing corresponds to a triggering event in which at least two of the different chart elements overlap as a result of the resizing; and
the computing system, in response determining that the resizing corresponds to the triggering event, optimizing a display of the chart visualization by at least displaying a resized chart visualization and modifying the one or more different chart elements of the at least two different chart elements within the resized chart visualization, including removing the one or more different chart elements of the at least two different chart elements from a main portion of the chart visualization and placing it into an interactive tooltip.

17. The method of claim 16, wherein the triggering event includes determining that the at least two different chart elements are overlapping by the predetermined amount of overlap within a predetermined contrast variance threshold.

18. A computing system configured for utilizing selective triggering events for optimizing chart visualizations, the computing system comprising:
one or more processors; and
one or more hardware storage device having stored computer-executable instructions which are executable by the one or more processors to optimize computer visualizations by at least causing the computing system to perform the following:
the computing system accessing a chart visualization, displayed at the computing system, that includes a plurality of different chart elements;
the computing system detecting input affecting visibility of the chart visualization;
the computing system determining that the input causes one or more of the different chart elements to be at least partially obscured; and
the computing system, in response determining that that the input causes one or more of the different chart elements to be at least partially obscured, selectively optimizing a display of the chart visualization by at least displaying a modified chart visualization, including removing the one or more different chart elements from a main portion of the chart visualization and placing it into an interactive tooltip.

19. The computing system of claim 18, wherein the input includes input that moves an object from outside of the chart visualization to overlap with the chart visualization.

* * * * *